United States Patent [19]

Amon et al.

[11] 4,420,515

[45] Dec. 13, 1983

[54] METALLIZATION PROCESS FOR PROTECTING DOCUMENTS OF VALUE

[75] Inventors: Maurice A. Amon, New York, N.Y.; Haim Bretler, Lausanne, Switzerland

[73] Assignee: Sicpa Holding, S.A., Glarus, Switzerland

[21] Appl. No.: 295,014

[22] Filed: Aug. 21, 1981

[51] Int. Cl.$^3$ .......................... B32B 3/30; B44C 1/16; B41M 3/14

[52] U.S. Cl. ...................................... 428/29; 156/220; 156/233; 156/234; 156/235; 156/240; 156/241; 156/247; 156/249; 156/277; 427/7; 428/172; 428/206; 428/207; 428/208; 428/209; 428/211; 428/323; 428/328; 428/916

[58] Field of Search ................ 156/219, 220, 233-235, 156/237, 238, 240, 241, 247, 277, 249; 427/7; 428/156, 172, 207, 209, 211, 916, 29, 195, 206, 208, 323, 328, 537, 333

[56] References Cited

U.S. PATENT DOCUMENTS 4,124,947 11/1978 Kuhl et al. .............................. 427/7

4,215,170 7/1980 Oliva .................................. 428/209

*Primary Examiner*—Bruce H. Hess

*Attorney, Agent, or Firm*—Lieberman, Rudolph & Nowak

[57] ABSTRACT

A process for preventing the counterfeiting of valuable documents through use of photography, photocopying techniques, or other methods of counterfeiting. The process includes laminating an extremely thin metallic film to the substrate of the valuable document before the document is printed with the area of the metallic film being small in comparison to the area of the document. The metallic film can be located anywhere on the face of the document and a "latent image" is embossed on the metallic film when the document is printed. Embossing the latent image on the metallic film, rather than on the document substrate, provides many advantages not possible in the prior art.

A photocopy of a document containing the embossed metallic film does not include the latent image and a color photocopy will be different in color than the original document. Therefore, a lay observer can readily differentiate between a genuine document and a counterfeit document.

5 Claims, 1 Drawing Figure

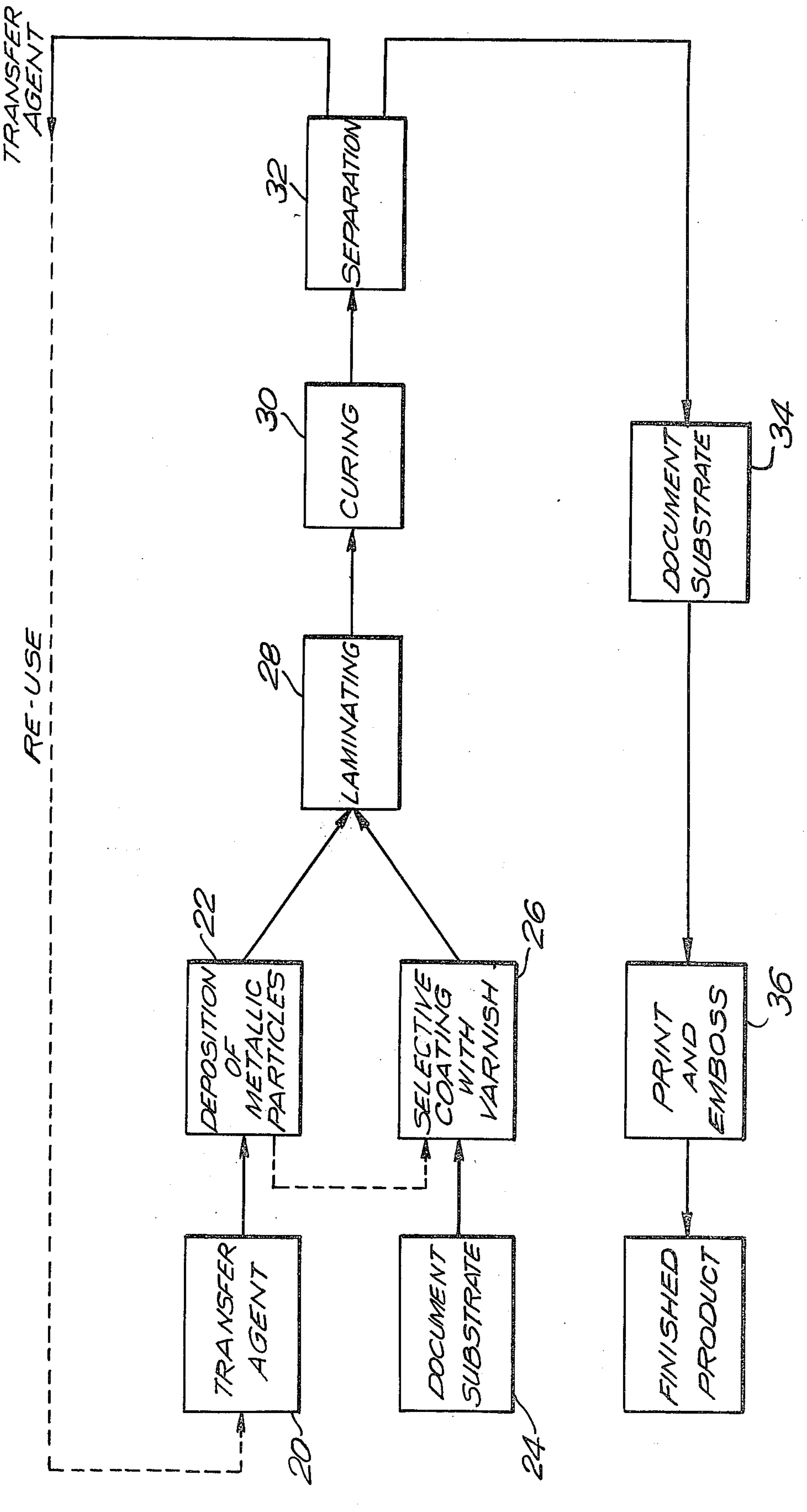
TRANSFER AGENT
20
DEPOSITION OF METALLIC PARTICLES
22
DOCUMENT SUBSTRATE
24
SELECTIVE COATING WITH VARNISH
26
LAMINATING
28
CURING
30
SEPARATION
32
DOCUMENT SUBSTRATE
34
PRINT AND EMBOSS
36
FINISHED PRODUCT
RE-USE
TRANSFER AGENT

METALLIZATION PROCESS FOR PROTECTING DOCUMENTS OF VALUE

FIELD OF THE INVENTION

This invention relates to printed matter and more particularly to a novel and improved process for preventing the counterfeiting of documents of value such as bonds, bank notes, stock certificates and the like.

BACKGROUND OF THE INVENTION

The counterfeiting of valuable documents such as bank notes, bonds, stock certificates, credit cards, and stamps has been, and continues to be, of major concern to government agencies, banking institutions and security firms.

This concern has greatly increased in the recent past as modern photocopy methods continue to improve. Present day photocopiers already have the capability to make faithful color reproductions of valuable documents which are of sufficient quality to pass a casual inspection by a lay observer. As a specific example dollar bills have been copied and the copies successfully used in dollar bill changers.

Continuing improvement in photocopy technology will exacerbate the problem of counterfeiting. It is anticipated that photocopies will be of such quality within the next five years that skilled personnel using the most sophisticated and advanced detection equipment will be required to detect counterfeit documents. As counterfeit documents are normally passed through lay personnel, lacking even rudimentary detection equipment, it is clear that counterfeiting through the use of photocopy techniques will soon become an uncontrollable problem.

Various techniques have been proposed in the past to permit detection by a lay person of a counterfeit document. Such techniques are described for example in U.S. Pat. No. 4,033,059 granted to R. G. Hutton et al. on July 5, 1977 and U.S. Pat. No. 4,124,947 granted to Adolf Kuhl et al. on Nov. 14, 1978. The technique described in both patents is similar and involves imprinting inked intaglio pattern elements, such as lines, on a document of value. As is well known, an intaglio imprint is obtained by pressing paper, or other substrates, against an engraved plate which is inked whereby the substrate is deformed (i.e. raised images are created) while being inked. The pattern elements are arranged to form background portions and readily recognizable image portions by making the pattern elements, which form the image portions, different in depth and orientation from the pattern elements which form the background portions. Varying orientation and depth of the pattern elements, in combination with inking, results in an image portion which blends with the background portion from one angle of view but which appears as a readily recognizable symbol from another angle of view. Such an image which varies in appearance when the angle of view is changed, is known as a "latent image."

A latent image, when imprinted with intaglio techniques on a document of value, is readily observed by a lay observer as the image appears and disappears as the observer varies his angle of view. This phenomenon results from the unique arrangement of pattern elements discussed above and is not observable on the portions of a document lacking the arrangement of pattern elements. However, when a photocopy is made of such a document it is, of course, made from a fixed angle of view. Therefore, the photocopy will contain only one aspect of the image, either the image of the readily recognizable symbol or the image blended into the background, with the copied aspect being dependent on which angle of view is chosen. Accordingly, a lay observer has no difficulty in detecting a photocopy counterfeit as the image will not change as the angle of view is varied.

Although the technique described in the U.S. patents discussed above has certain advantages over other methods of detecting counterfeit documents, several problems remain. First, the image must be ilnked to make it visible, with the color of the raised portion of the image necessarily being different than the color of the underlying document substrate. The necessity for inking adds expense and complexity to the process making it less desirable to a wide variety of users.

A second problem is that great care must be taken to create an image that is clearly visible from one angle of view and essentially invisible from a second angle of view. Unless great care is taken in creating the image it will be visible from any angle of view, completely destroying the advantage of detecting counterfeit documents with a latent image.

Still another problem with the prior art methods is if a color photocopy is made of the latent image the color of the copy may be the same as the original, although of course the latent image effect will be last. The fact that the colors are the same makes detection of a counterfeit document more difficult.

It is therefore an object of the present invention to provide a process for protecting valuable documents that does not have the disadvantages of the processes described above.

It is a further object of the present invention to provide a method for protecting valuable documents that is inexpensive and readily used by printers equipped for security printing.

It is a still further and general object of the present invention to provide a method for protecting valuable documents that can be used by a lay observer without the need for detection equipment.

SUMMARY OF THE INVENTION

In accordance with the instant invention, a valuable document is protected from counterfeiting by selectively laminating an extremely thin film of metallic particles to a predetermined portion of the valuable document substrate before the document is printed.

It is a feature of the invention that the metallic film has a distinct pattern embossed therein at the time the document is printed, the distinct pattern forming a latent image which is clearly visible from one angle of view and essentially invisible from a second angle of view.

It is another feature of the invention that the latent image embossed in the metallic film is not reproducible with photograph or photocopying techniques, such that a counterfeit document is readily detected due to the absence of the latent image on the photograph or photocopy.

It is another feature of the invention that the latent image embossed in the metallic film is extremely durable, does not require inking, and will not wear as the document ages.

It is still another feature of the invention that the metallic film is extremely thin, such that it is virtually flush with the substrate of the document.

It is a further feature of the invention that laminating the metallic film to the document substrate is inexpensive and readily accomplished by manufacturing techniques known to security printers.

It is another feature of the invention that laminating the metallic film to the document substrate makes any method of counterfeiting extremely difficult as the process of metallization is one of high technology not readily available to the public.

It is a still further feature of the invention that a color photocopy of the latent image embossed in the metallic film will be a different color than the original, making detection easier by a lay person.

BRIEF DESCRIPTION OF THE DRAWING

The drawing illustrates a block diagram of the process of the instant invention, which protects a valuable document from counterfeiting through photocopying techniques.

DETAILED DESCRIPTION

The instant invention describes the process, and the product formed thereby, which prevents counterfeiting of valuable documents through the use of photocopying techniques as well as by other counterfeiting techniques.

The process described below consists essentially of four steps. First, a transfer agent is metallized by the deposition of metallic particles so that a thin metallic coating of aluminum (or some other metal) is applied to the transfer agent. The metallic coating is on the order of 100 angstroms to 500 angstroms in thickness.

Next, a valuable document substrate is coated with varnish, a predetermined locations, through use of a gravure or flexographic coator/laminator and the transfer agent is laminated to the document substrate. Laminating the document substrate to the transfer agent transfers the metallic coating to the predetermined locations on the document substrate as the metallic coating is emersed in the varnish and bonded to the document substrate giving a metallic appearance to the predetermined locations on the substrate.

The next step in the process consists of curing the varnish with a conventional curing process. Once the varnish has cured it does not bond to the transfer agent, but bonds strongly to the document substrate. After curing, the transfer agent is separated from the document substrate and the metallic coating now on the document substrate takes on the smoothness of the transfer agent, thereby giving a bright and shiny appearance as the surface is now highly reflective.

Subsequent to curing and separation the metallized valuable document is simultaneously printed and embossed. Printing is applied to the document substrate at locations other than the predetermined locations bearing the metallized film. The metallized film portions are embossed with a latent image of the type described in U.S. Pat. No. 4,124,947 and discussed hereinabove.

The resultant finished product consists of a document having a small metallized portion on which has been embossed a pattern clearly visible to a lay observer when the angle of view is varied. In this manner a lay observer can readily detect the genuineness of the document by simply observing the metallized portion, varying the angle of view, and observing the appearance and disappearance of the image. When the document is copied, however, the angle of view is fixed and the resultant copy contains an image that will not vary as the angle of view is changed. Therefore, a lay observer can readily distinguish between a counterfeit document and a genuine document.

The instant invention provides several advantages over prior art processes. Most importantly, the metallized portion of the document is readily embossed to form a clearly visible latent image as the metallized portion deforms much easier than does the document substrate itself. In addition, creation of the latent image on the metallized portion does not require inking to make the image visible due to the highly reflective surface of the metallized portion. Also since the metallized surface reflects both ultra-violet and infra-red light a color photocopy will be of a different color than the original, an additional security feature.

The process and product of the instant invention will now be described in detial with reference to the figure.

The figure illustrates a block diagram of the process of the instant invention. The instant inventive process is similar to the process described in U.S. Pat. No. 4,215,170, which is incorporated herein by reference, but differs in several important respects as will be described below. Transfer agent 20 is a plastic film such as untreated polypropylene, polyester or polyvinyl chloride, and must be finely finished since it will impart the final surface to the metallized portions of the final document. The most efficient form of production of metallic coated surfaces occurs when transfer agent 20 is in the form of an elongated web of material which may be fed by roller means in accordance with the techniques in U.S. Pat. No. 4,215,170.

The transfer agent undergoes the step of metallic deposition at step 22 in accordance with the method of metallization described in detail in U.S. Pat. No. 4,215,170. Briefly transfer agent 20 is fed into a conventional vacuum chamber where a metal such as aluminum is deposited upon the transfer agent. The resultant metallic film on the transfer agent has a thickness of approximately 100 angstroms to 500 angstroms and this extremely small thickness permits minimal use of metallic materials yet upon conclusion of the process gives the appearance of a completely metallized and continuous metal surface.

Document substrate 24 is the material on which the finished valuable document will be printed. The substrate may be in web or sheet form and have a rough or smooth surface. The substrate is selectively coated with varnish at predetermined locations with a gravure or flexographic coater/laminator. It is anticipated that the portion of the finished valuable document containing a metallized surface will be approximately one half inch square. The location form, and size of the metallized surface on the finished document can be selected at will by simply varying the location form and size of the areas of varnish applied to the document substrate. The manner of applying the varnish and the amount needed is fully described in U.S. Pat. No. 4,215,170.

The selectively coated document substrate and the transfer agent are laminated at step 28. More particulary the respective webs of substrate 24 and transfer agent 20 are brought together in face-to-face relationship between a pair of rollers and pressure is applied to laminate substrate 24 to transfer agent 20. The step of lamination is a continuous step after selective coating step 26 and depositing step 22 and must occur before the varnish has had a chance to cure or set. The pressure required and the types of rollers used for lamination are described in U.S. Pat. No. 4,215,170.

Subsequent to lamination the varnish is cured at step 30. Curing may occur naturally in approximately 24 hours or the curing may be speeded up with the use of different varnish, the application of heat or exposure to radiation. As the varnish sets the metallic particles deposited on transfer agent 20 become completely trapped by the varnish located on predetermined areas of substrate 24. Significantly, the varnish takes on the smooth appearance of the transfer agent but no bonding whatsoever takes place between the varnish and the transfer agent.

After curing the separation or delamination step takes place at 32. This process is also described in U.S. Pat. No. 4,215,170 and consists of stripping the transfer agent from the document substrate. During this process the metallic coating is transferred to the selectively located varnish layers and the document substrate thereby acquires metallic portions at predetermined locations. After separation the transfer agent may be reused after it is cleansed of any remaining metal particles.

The selectively metallized document substrate, symbolically indicated at 34, is next subjected to step 36 where the simultaneous printing and embossing process occurs. The document may be printed in any well known manner including intaglio printing. A selective portion of the printing means contains the means for embossing a selective pattern on the metallized portions of the document. This pattern may take the form as described in U.S. Pat. No. 4,124,947, or any other suitable form which will permit the formation of a latent image on the metallized portions.

Subsequent to printing and embossing, the finished product is cut or divided into a plurality of separate valuable documents if so desired.

It is also possible, through use of the process of the instant invention, to achieve the appearance of interference colors on the metallized portions of the document. This is accomplished by increasing the density of the lines comprising the pattern placed on the metallized portion to between 1,000 and 3,000 lines per millimeter. When the density is this high a large angular dispersion is achieved such that discrete color shifts become visible to the observer as the angle of view varies. This is possible because the pattern is embossed on a metallized surface, an advantage not possible if the pattern was embossed on the substrate itself.

The process described above results in a product immune from counterfeiting through photography, photocopying techniques or other counterfeiting methods and has many advantages over the prior art. The latent images embossed on the document are clearly visible to a lay observer, will not fade with age and handling and do not require inking. Color photocopies are always different in color than the original document and interference colors can also be created as the image is embossed on a metallized film. The metallized film can be applied to any paper, board or other substrate with no special precoating requirement. There are no special moisture requirements because no moisture is removed from the document substrate during the process. Through selective varnish coating the metallized film is also applied in register as described above.

Although the present invention has been described in conjunction with preferred embodiments it is to be understood that modification and variation may be resorted to, without departing from the spirit and scope of the invention as those skilled in the art will readily understand. Such modifications and variations are considered to be within the scope of the invention and the appended claims.

We Claim:

1. A process for preventing the counterfeiting of a valuable document comprising the steps of:

depositing, on a reusable transfer agent, a film of metallic particles of the order of magnitude of substantially less than 1000 Angstroms in thickness; coating portions of a valuable document substrate with varnish at predetermined locations; laminating said valuable document substrate and said transfer agent together before said varnish is cured so that said metallic particles are embedded in said varnish at said predetermined locations; curing said varnish; separating said transfer agent from said valuable document substrate whereby said valuable document substrate is provided at said predetermined locations with said film of metallic particles, which film permits some light transmission, appears continuous and smooth, and exhibits a specular metallic finish; and simultaneously printing and embossing said valuable document substrate, said printing being applied to locations other than said predetermined locations and said embossing being applied only at said predetermined locations so as to form a latent image in said film of metallic particles in said predetermined locations, said latent image being clearly visible from a first angle of view and being essentially invisible from a second angle of view and said latent image being formed without the use of ink.

2. A process in accordance with claim 1 wherein said valuable document substrate may include a plurality of separate valuable documents, the process further including the step of separating said valuable document substrate into a plurality of separate valuable documents, each valuable document having thereon at least one film of metallic particles at a predetermined location.

3. A process in accordance with claim 1 wherein said coating step is performed in register with a gravure laminator.

4. A process in accordance with claim 1 further including the steps of cleaning said transfer agent to remove any remaining metal particles after it has been removed from said valuable document substrate; and reusing said cleaned transfer agent.

5. A valuable document formed by the steps of:

depositing on a reusable transfer agent, a film of metallic particles of the order of magnitude of substantially less than 1000 Angstroms in thickness; coating portions of a valuable document substrate with varnish at predetermined locations; laminating said valuable document substrate and said transfer agent together before said varnish is cured so that said metallic particles are embedded in said varnish at said predetermined locations; curing said varnish; separating said transfer agent from said valuable document substrate whereby said valuable document substrate is provided at said predetermined locations with said film of metallic particles, which film permits some light transmission, appears continuous and smooth, and exhibits a specular metallic finish; and simultaneously printing and embossing said valuable document substrate, said printing being applied in locations other than said predetermined locations and said embossing being applied only at said predetermined locations so as to form a latent image in said film of metallic particles in said predetermined locations, said latent image being clearly visible from a first angle of view and being essentially invisible from a second angle of view and said latent image being formed without the use of ink.

* * * * *